Oct. 4, 1932. H. B. BARNETT 1,880,395
SHIPPING BRACKET
Filed March 27, 1928 2 Sheets-Sheet 1

Inventor
H. B. Barnett
By his Attorney
W. M. Wilson

Inventor
H. B. Barnett
By his Attorney

Patented Oct. 4, 1932

1,880,395

UNITED STATES PATENT OFFICE

HARRY B. BARNETT, OF CLEVELAND, OHIO, ASSIGNOR TO DAYTON SCALE COMPANY, OF DAYTON, OHIO, A CORPORATION OF NEW JERSEY

SHIPPING BRACKET

Application filed March 27, 1928. Serial No. 265,202.

This invention relates to devices to be applied to weighing scales of the type disclosed in the patent to Strachan No. 1,623,137, dated April 5, 1927.

More particularly, the object of the invention is to provide a shipping attachment for application to a weighing scale to hold all of its movable parts stationary to prevent damage to these and other parts when shipping the scale.

Further, the object of the invention is to provide such a shipping attachment which may be easily applied at the factory and readily removed at the destination of the scale by an inexperienced person.

Still further, the object of the invention is to provide a device which by application to one movable part, will prevent movement of all the other movable parts.

Other objects and advantages will be hereinafter set forth in the specification and claims and shown in the drawings which by way of illustration show a preferred embodiment of the invention.

Figure 1:
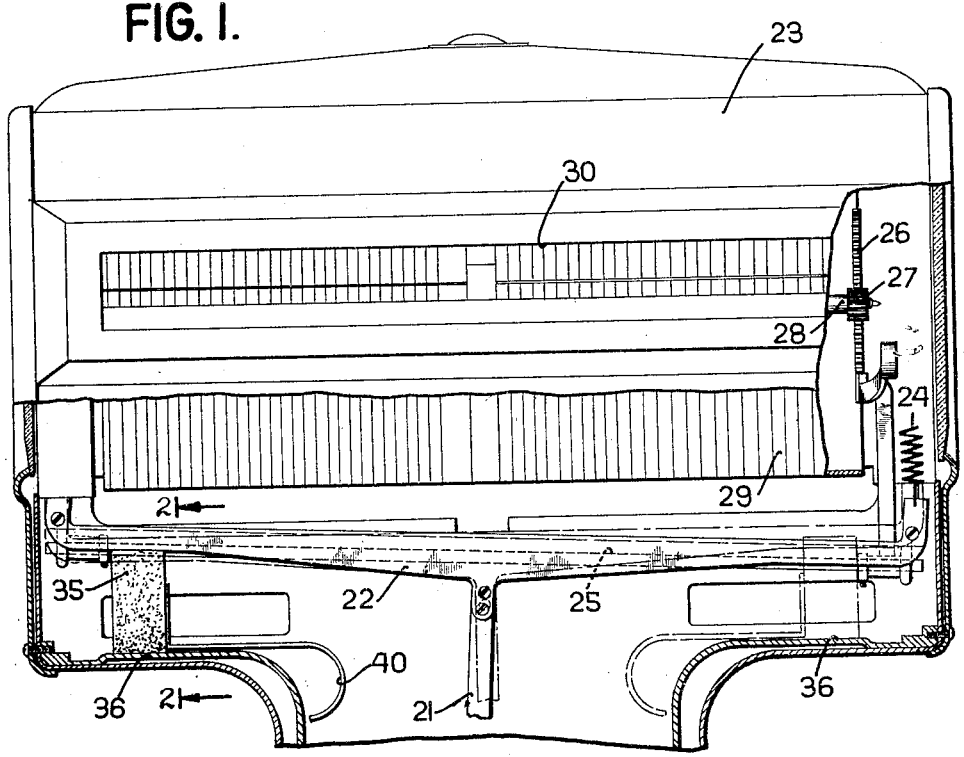
Fig. 1 is a section through the drum housing of the scale.

Referring now to the drawings, 10 is the base casting of the scale having a fulcrum stand 11 which supports the fulcrum pivots 12 of the lever 13 in the usual manner. The lever is provided with a pivot 14 engaging the load pivots of the platform or pan supporting frame 15. The right hand end of lever 13 (as viewed in Fig. 4) has a pivot 16 coacting with the bearing pieces 17 carried by the lower end of a stirrup 18. Adjacent pivot 16, lever 13 has on its upper edge a lug 19 adapted to limit the movement of lever 13 counterclockwise by contact with the bottom of frame plate 20.

Figure 3:
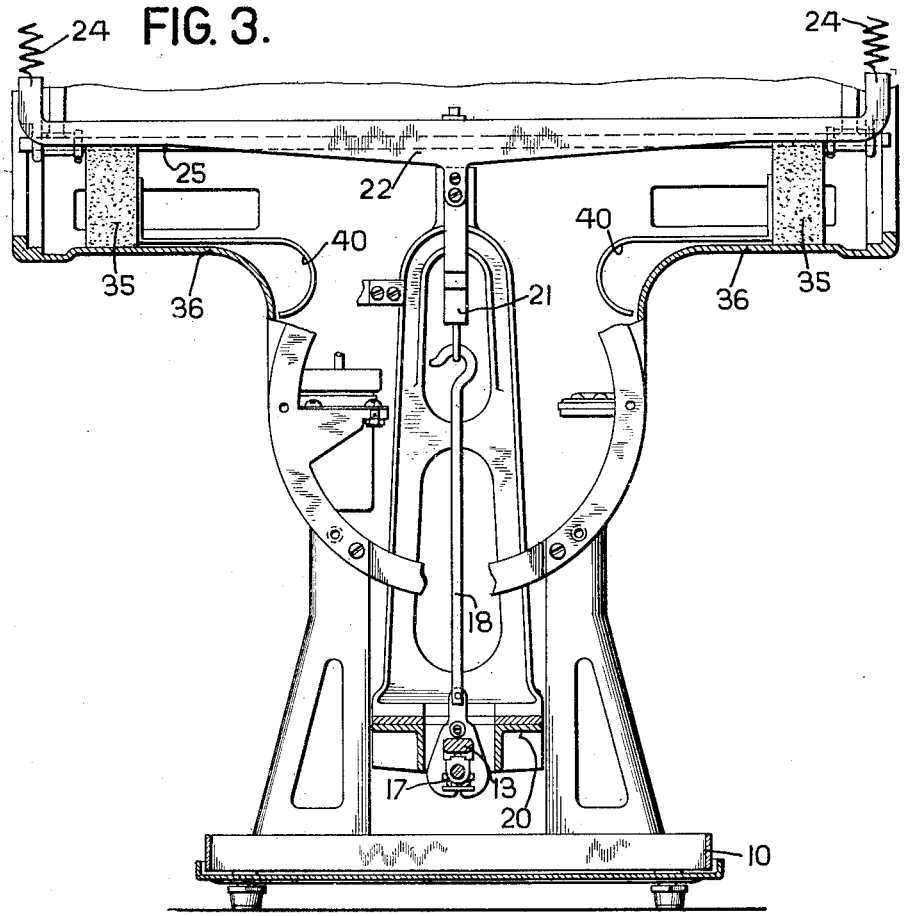
Fig. 3 is a view showing the lower and intermediate portions of the scale.

The upper end of the stirrup 18 is hooked to a load counterbalancing connecting element 21 (Fig. 3). The element 21 is fastened to a horizontal member 22 which is positioned longitudinally of the drum casing 23. Each end of the member 22 is bent upwardly and has attached thereto the end of a load offsetting spring 24. A rack carrying bar 25 is fixed to member 22 for movement therewith during weighing operations. The bar 25 has fixed to each end thereof racks 26 (Fig. 1) meshing with pinions 27 on the shaft 28 carrying the drum chart 29 which is readable through a longitudinal window 30 in the drum casing.

After all of the aforesaid parts have been assembled, the shipping bracket forming an essential part of my invention is applied to the scale and is effective to hold all the normally movable parts fixed against movement. The shipping bracket comprises a block 35 of wood or other suitable material (Fig. 2), the sides and bottom of which are shaped to substantially conform with the shape of the sides and bottom of the horizontally extending channel portions 36 of the scale housing. The top of block 35 has a pair of projections 37 (Fig. 2) formed by the sides extending above an intermediate surface 38 which is interrupted by a groove 39 extending through the block. To one face of the block, a handle 40 is attached for convenience in manipulating the block into and out of position in the scale. The sides, top and bottom, of the block 35 are covered with a shock absorbing material 41, preferably of felt.

Figure 2:
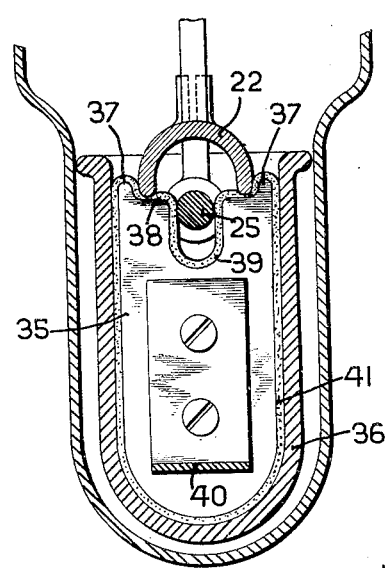
Fig. 2 is a section on line 2—2 of Fig. 1.
Figure 4:
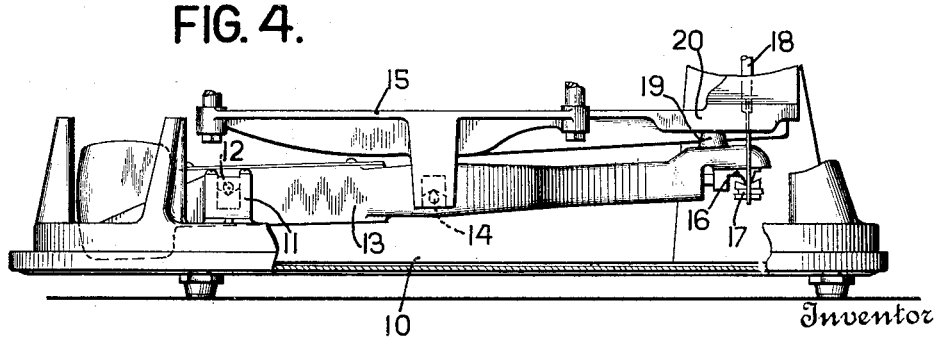
Fig. 4 is a side view of the lower portion of the scale.

In the use of the above described shipping block, the front of the scale housing is opened to permit access to the drum casing. The handle 40 of a shipping block 35 is then grasped by the operator and the block moved into the position shown in Fig. 1. A second block is moved to a similar position on the other side of the scale, the position of the parts then being as shown in Figs. 2, 3 and 4. The placing of blocks 35 in the positions described raises the member 22 and all the parts connected thereto. Thus the rack rod 25, the element 21 and stirrup 18 are lifted with the member 22.

The lifting of stirrup 18 results in rocking lever 13 counterclockwise until lug 19 thereon contacts the bottom of frame plate 20 which thereupon prevents further movement of lever 13 and stirrup 18. All the other parts associated with stirrup 18, namely member 22, rod 25, shaft 28, and drum 29, are also prevented from moving upwardly upon contact of lug 19 with frame 20. The top of the blocks prevent downward movement of these parts by contact with the member 22. The latter and all the parts connected thereto are thus held from vertical movement in either direction while blocks 35 are in position in the scale. As may be seen in Fig. 2, the projections 37 of the top of the block prevent lateral movement of the member 22 while said member is resting on surface 38. Groove 39 fits over rack carrying rod 25 and prevents lateral movement of the latter.

When the scale is received at its destination, the front of the scale is again removed and the handles 40 are in convenient reach for pulling out the blocks 35. The movable parts of the scale are thus returned to their normal operative status.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

I claim:

1. A shipping attachment for weighing scales provided with a plurality of interconnected commonly movable elements, comprising members adapted to engage one of said elements to move said element to inoperative position, said element being connected to the other movable elements to move all of said elements to inoperative position, and a handle permanently provided on each of said members.

2. A shipping attachment for weighing scales, comprising a member having a portion shaped to conform to a stationary part of the scale, a second portion on said member adapted to engage a movable weighing element to prevent vertical movement thereof, a groove in said member adapted to receive a second movable weighing element, and projections on said member one on each side of said groove for engaging said first-named weighing element to prevent lateral movement of the latter.

3. A shipping block comprising a block of hard material, for lifting a movable scale part to inoperative position, said block having a surface adapted to engage said scale part to lift it, a projection on each side of said surface adapted to prevent lateral movement of said scale part, and a groove extending below said surface to accommodate a second scale part.

4. A shipping block having one end thereof provided with a pair of projections, an intermediate surface extending below said projections, and a groove cutting said intermediate surface, and a handle provided on one side of said block extending parallel to said end.

5. A shipping block for a weighing scale, comprising a member having a portion adapted to rest on a horizontal stationary interior part of the scale frame and a second portion adapted to engage a movable part of the scale which extends parallel to said stationary part to prevent movement of said movable part, said member being freely slidably non-rotatably insertable into the interior of said scale and into operative position between said scale parts.

6. In a scale provided with a plurality of connected commonly actuatable movable elements and a housing enclosing the same, a member adapted to be inserted from the outside of the housing into the interior of the housing to thereupon jointly engage one of said elements and a part rigid relative to said housing to prevent movement of all of said elements the member being removable at will from the housing to release the elements for operation.

7. A shipping attachment for a scale of the type having an equalizer bar and a draw bar associated therewith, the shipping attachment comprising a member engaging the scale frame and having surfaces for simultaneously engaging and holding both the equalizer and draw bars against movement relative to the scale frame.

In testimony whereof I hereto affix my signature.

H. B. BARNETT.